Patented Jan. 30, 1945

2,368,338

UNITED STATES PATENT OFFICE 2,368,338

SUBSTITUTED THIOBARBITURIC ACIDS AND SALTS THEREOF

Lewis A. Walter and Louis H. Goodson, East Orange, N. J., assignors to The Maltbie Chemical Company, Newark, N. J., a corporation of New Jersey No Drawing. Application April 23, 1943, Serial No. 484,316

17 Claims. (Cl. 260—257)

The present invention relates to certain new and useful chemical compounds, viz. 5,5 disubstituted thiobarbituric acid derivatives, and their salts, having the formula:

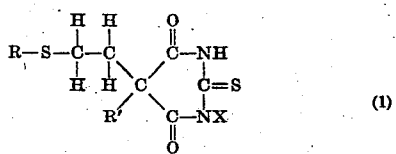

wherein R and R' are hydrocarbon groups, either saturated or unsaturated, and either the same or different, and each of which contains not more than six carbon atoms, and wherein the sum of the carbon atoms in R and R' does not exceed 10, it being understood that R has a carbon atom attached directly to the sulfur of the betathioethyl group

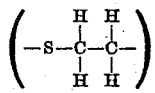

and R' has a carbon atom attached directly to the carbon atom forming the barbituric acid nucleus; and wherein X is a member of a group consisting of hydrogen, alkali-metal, an equivalent of alkaline earth metal, ammonium, monoalkyl ammonium, dialkyl ammonium, alkanol ammonium and an equivalent of alkylene diammonium.

These novel thiobarbituric acid compounds and their salts, when tested pharmacologically, have been found to possess useful and valuable hypnotic and sedative properties, making them valuable for various medical purposes. The compounds are, in general, pale yellow in color, and are generally crystalline solids.

In general, the following method has been found desirable, and is the best now known to us, for the preparation of our novel thiobarbituric acid derivatives herein described; but other methods of synthesis may also be employed, as for example, synthesis through the corresponding disubstituted cyano acetic ester.

According to what is at present a preferred procedure for synthesis, a disubstituted malonic ester is condensed with thiourea in the presence of sodium ethoxide in absolute ethanol, as is illustrated by the following equation:

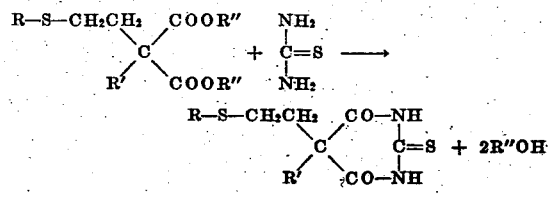

wherein R and R' have the significance stated above and R'' is a lower alkyl group. When the reaction is complete, the solvent is removed by distillation and the residue dissolved in water.

The resulting solution is then extracted with ether and the aqueous layer separated and acidified. A precipitate of crude thiobarbituric acid results, which may be purified by crystallization from a suitable solvent such as ethanol. In those cases in which the material does not crystallize readily, it is washed with sodium bicarbonate solution, dried, and converted to the sodium salt with sodium ethoxide in absolute ethanol. On cooling, the sodium salt crystallizes as an alcoholate which is purified by crystallizing from absolute alcohol.

The disubstituted malonic esters may be prepared readily by condensing beta chloroethyl sulfides with sodio monoalkyl malonic esters, preferably in an inert solvent such as toluene or benzene, as illustrated by the following equation:

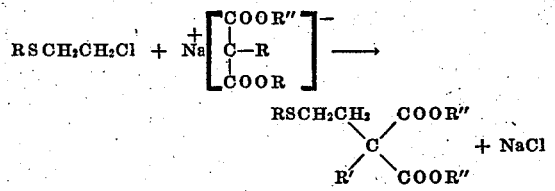

Salts of the compounds may be prepared as hereafter described.

The following specific examples are illustrative of the novel compounds according to our invention:

EXAMPLE 1

*5-β-ethylthioethyl-5-isoamyl thiobarbituric acid*

To 1.1 moles of sodium dissolved in 500 cc. of absolute alcohol, and 0.5 mole of β-ethylthioethyl isoamyl malonic ester (boiling point 130–133° C. at 1 mm.), 0.6 mole of thiourea is added. This mixture is refluxed on a steam bath for 12 hours, the alcohol is removed by vacuum distillation and the residue is dissolved in about 600 cc. of water. The resulting solution is extracted with ether and the aqueous layer is separated and acidified, yielding a precipitate of 5-β-ethylthioethyl-5-isoamyl thiobarbituric acid. This crude product is filtered off and purified by crystallization from alcohol. It has a melting point of approximately 111–113° C. (uncorrected), and is represented by the formula:

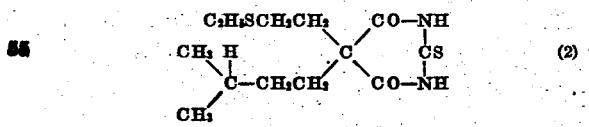

EXAMPLE 2

5-β-n-butylthioethyl-5-isopropyl thiobarbituric acid

This compound is prepared by condensing 0.5 mole of β-n-butylthioethyl isopropyl malonic ester (boiling point 130–133° C. at 1.5 mm.), 0.6 mole of thiourea, and 1.1 moles of sodium ethoxide in 500 cc. absolute alcohol in the same manner described in Example 1. The crude product does not crystallize readily so it is dissolved in ether, filtered free of colloidal material and diluted with ligroin. The product was found to crystallize, and to have a melting point of approximately 68–70° C. It is represented by the formula:

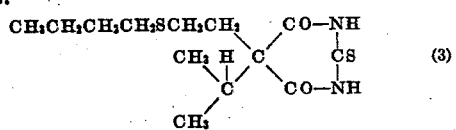

EXAMPLE 3

5-β-n-butylthioethyl-5-allyl thiobarbituric acid

This compound is prepared from 0.5 mole of β-n-butylthioethyl allyl malonic ester (boiling point 130–135° C. at 1.3 mm.), 0.6 mole of thiourea, and 1.1 moles of sodium ethoxide in 500 cc. absolute alcohol in the same manner described in Example 1. The crude product does not crystallize. It is dissolved in ether, filtered free of colloidal material, washed with sodium bicarbonate solution and the ether distilled. The product is dried in a vacuum and dissolved in one equivalent of a 20% solution of sodium ethoxide in absolute alcohol. On cooling the sodium salt crystallizes as an alcoholate, and it is recrystallized from absolute alcohol. This sodium salt is dried in a vacuum over sulfuric acid to remove alcohol. The free barbituric acid obtained by acidification of an aqueous solution of the sodium salt is a waxlike compound. It is represented by the formula:

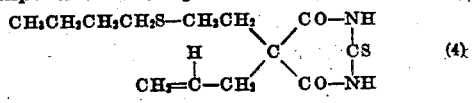

From the foregoing examples, it will be observed that the substituent groups R and R', as defined above, are capable of considerable variation within those limits while producing useful and valuable compounds. Among the derivatives specifically included in the invention are the following illustrative examples of our novel derivatives, including the specific compounds previously described, and which, when tested pharmacologically, were found to possess valuable and useful properties as hypnotics or sedatives:

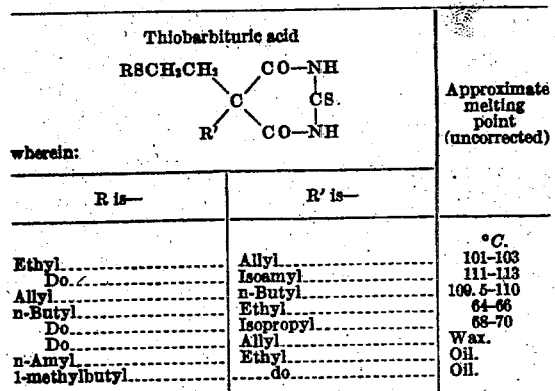

| R is— | R' is— | Approximate melting point (uncorrected) °C. |
|---|---|---|
| Ethyl | Allyl | 101–103 |
| Do. | Isoamyl | 111–113 |
| Allyl | n-Butyl | 109.5–110 |
| n-Butyl | Ethyl | 64–66 |
| Do. | Isopropyl | 68–70 |
| Do. | Allyl | Wax. |
| n-Amyl | Ethyl | Oil. |
| 1-methylbutyl | do | Oil. |

SALTS OF THE NOVEL THIOBARBITURIC ACID DERIVATIVES

Sodium salts of the thiobarbituric acids described above may be prepared by dissolving one equivalent of the disubstituted barbituric acid in a 15–20% solution of one equivalent of sodium ethoxide in absolute alcohol. On cooling, the sodium salt usually crystallizes as an alcoholate which may be dried in a vacuum to remove the alcohol. Many of the sodium salts so obtained are hygroscopic powders and are readily soluble in water; these aqueous solutions are alkaline in reaction. When administered orally, or hypodermically, in proper dosage they are good and useful hypnotics or sedatives.

Calcium salts may be prepared by treating an absolute alcohol solution of the sodium salt with the metathetical amount of alcoholic calcium chloride, filtering off the precipitated sodium chloride and concentrating the alcoholic solution to yield the calcium salt.

The ammonium, alkyl and alkanol ammonium salts may be prepared by dissolving the corresponding thiobarbituric acid in an excess of ammonia or amine and subsequently removing the excess quantity of base.

In the following claims it is to be understood that "thiobarbituric acid derivative" and similar expressions, includes, also, the salts of such derivatives, such as, for example, the salts described above.

The examples given above, and illustrative processes for their production, include the best embodiments of our present invention now known to us; but it is to be understood that the invention is not necessarily or specifically limited thereto and may, under proper conditions, have other embodiments, produced in other ways, without departure from the spirit of the invention, and within the scope of the following claims.

What we claim is:

1. As a new and useful chemical compound, a 5,5 disubstituted thiobarbituric acid derivative having the formula:

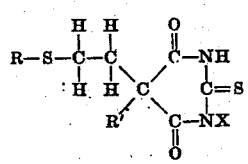

wherein R and R' are hydrocarbon groups, each of which contains not more than six carbon atoms, and wherein the sum of the carbon atoms in R and R' does not exceed 10, R has a carbon atom attached directly to the sulfur of the beta-thioethyl group

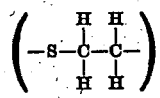

and R' has a carbon atom attached directly to the carbon atom forming the thiobarbituric acid nucleus; and wherein X is a member of a group consisting of hydrogen, alkali-metal, an equivalent of alkaline earth metal, ammonium, monoalkyl ammonium, dialkyl ammonium, alkanol ammonium, and an equivalent of alkylene di-ammonium.

2. A compound according to claim 1 in which X represents hydrogen.

3. A compound according to claim 1 in which at least one of the R and R' groups is a primary hydrocarbon group.

4. A compound according to claim 1 in which at least one of the R and R' groups is a primary hydrocarbon group and X represents hydrogen.

5. A compound according to claim 1 in which R and R' are both primary hydrocarbon groups.

6. A compound according to claim 1 in which R and R' are both primary hydrocarbon groups and X represents hydrogen.

7. A compound according to claim 1 in which R is a primary hydrocarbon group containing 4 carbon atoms and R' is a primary hydrocarbon group.

8. A compound according to claim 1 in which R is a primary hydrocarbon group containing 4 carbon atoms, R' is a primary hydrocarbon group and X represents hydrogen.

9. A compound according to claim 1 in which R is a n-butyl group and R' is a primary hydrocarbon group.

10. A compound according to claim 1 in which R is a n-butyl group, R' is a primary hydrocarbon group and X represents hydrogen.

11. A compound according to claim 1 in which R is a primary hydrocarbon group and R' is a secondary hydrocarbon group.

12. A compound according to claim 1 in which R is a primary hydrocarbon group, R' is a secondary hydrocarbon group and X represents hydrogen.

13. A compound according to claim 1 in which R is a secondary hydrocarbon group and R' is a primary hydrocarbon group.

14. A compound according to claim 1 in which R is a secondary hydrocarbon group, R' is a primary hydrocarbon group and X represents hydrogen.

15. 5-β-n-butylthioethyl-5-allyl thiobarbituric acid, having the formula:

$$CH_3CH_2CH_2CH_2-S-CH_2CH_2\diagdown C \diagup CO-NH \diagdown C=S$$
$$CH_2=C-CH_2 \diagup \diagdown CO-NH$$
$$\quad\quad\quad\;\; H$$

16. 5-β-(1-methyl-butyl)-thioethyl-5-ethyl thiobarbituric acid, having the formula:

$$\quad\quad\quad\quad\;\; CH_3$$
$$CH_3CH_2CH_2\overset{|}{\underset{|}{C}}-S-CH_2CH_2\diagdown C \diagup CO-NH \diagdown C=S$$
$$\quad\quad\quad\;\; H$$
$$\quad\quad\quad\;\; C_2H_5 \diagup \diagdown CO-NH$$

17. 5-β-n-butylthioethyl-5-isopropyl thiobarbituric acid, having the formula:

$$CH_3CH_2CH_2CH_2-S-CH_2CH_2\diagdown C \diagup CO-NH \diagdown C=S$$
$$CH_3 \diagdown C \diagup \diagdown CO-NH$$
$$CH_3 \diagup\;\; H$$

LEWIS A. WALTER.
LOUIS H. GOODSON.